Dec. 12, 1950

E. H. B. BARTELINK 2,533,662

AUTOMATIC TRUNK SELECTING SYSTEM FOR RADIO TELEPHONE STATIONS

Filed April 11, 1947

INVENTOR.

EVERHARD H. B. BARTELINK.

BY

Ward, Crosby & Neal.

ATTORNEYS.

Patented Dec. 12, 1950

2,533,662

UNITED STATES PATENT OFFICE 2,533,662

AUTOMATIC TRUNK SELECTING SYSTEM FOR RADIO TELEPHONE STATIONS

Everhard H. B. Bartelink, Bronxville, N. Y., assignor, by mesne assignments, to Automatic Electric Laboratories, Inc., Chicago, Ill., a corporation of Delaware Application April 11, 1947, Serial No. 740,959

9 Claims. (Cl. 250—6)

Figures 1, 2:
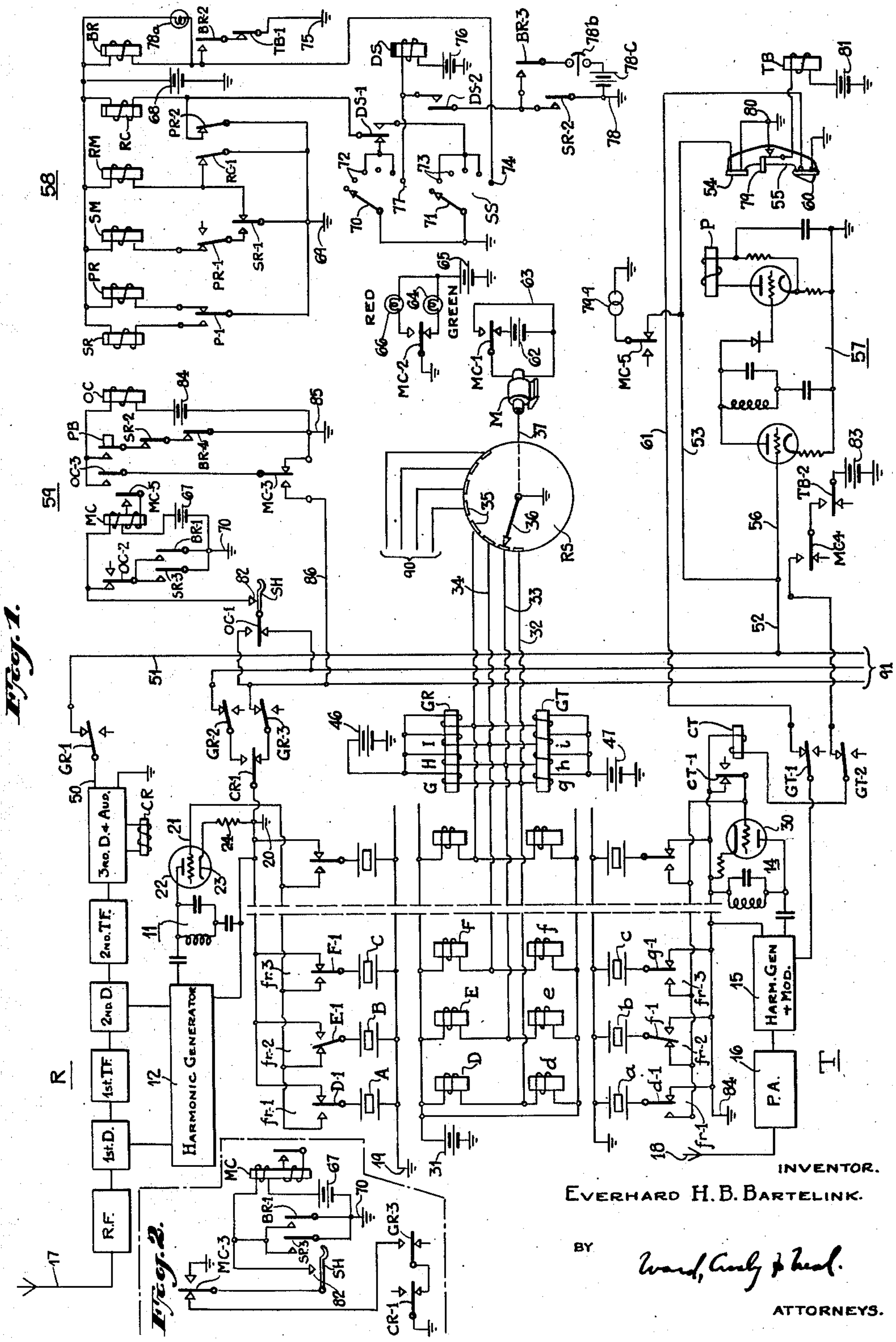

This invention pertains to two-way radio communication systems, and, more particularly, to multi-channel radio telephone systems comprising a central office and subscribers' stations linked thereto by radio.

A primary object of the invention is to provide means whereby the central office may call any of the subscriber's stations, or vice versa, over any of a number of radio channels operating on different frequencies.

In this connection, it is well known from wire telephony that for a given number of subscribers' stations and a given number of trunks available to establish connections between them, the traffic-handling capacity of the system is much larger if all subscribers have access to all trunks than if the subscribers are subdivided into groups, each group having access to only one trunk. In order to secure this same increase in traffic-handling capacity in radio-telephone systems of the character above noted, it is proposed, in accordance with the invention herein, to give all subscribers to this service access to more than one radio channel for initiating calls to or receiving calls from the radio-telephone central office. This is particularly important in view of the extremely small number of radio channels allocated to the common carriers.

In a multi-channel radio-telephone system, it is a simple matter for the central office operator to select an idle channel on outgoing calls, since her switchboard lamps indicate which channels are busy and which are idle. From the subscriber's end, however, the problem is not so simple, as he has no way of foretelling when and on which channel a call might be incoming. Conversely, on calls outgoing from a subscriber's station, the push-button method of idle radio channel selection is objectionable, because it necessitates testing until a free channel is found.

These difficulties and objections are overcome, in accordance with the present invention, by providing each subscriber's station with a mechanism for continuously and progressively testing all radio channels for incoming calls. Upon receipt of an incoming call, the testing mechanism, upon contacting the channel on which the call is placed, holds the subscriber's station connected to that channel until it is determined whether or not the call is intended for that particular station. If not, the testing is automatically resumed, but otherwise the connection is held and the subscriber's station signaled. On calls outgoing from a subscriber's station, the testing mechanism operates in a generally similar fashion. That is to say, upon removal of the subscriber's receiver from the switch hook, the testing mechanism continues to operate until an idle channel is located, whereupon the mechanism holds the calling station connected to that channel and signals the subscriber to that effect.

Although the invention is applicable to radio-telephone systems of the non-automatic type, employing, for example, code ringing or equivalent means for signaling the particular subscriber's station called, it is preferably employed, as disclosed in detail in its preferred embodiment herein, in automatic telephone systems employing dialing pulses for station selection, the subscribers' stations being equipped, to this end, with suitable station selector mechanisms responsive to incoming dial pulses.

Thus, in accordance with the preferred embodiment of the invention, each subscriber's station comprises radio transmitter and receiver elements, each having associated therewith a multiplicity of fixed tuning elements, such as piezo-electric crystals for tuning the same to the frequencies of the various radio channels respectively. A motor-driven rotary switch and associated relays are provided in conjunction with said tuning elements for progressively, momentarily and repeatedly tuning the transmitter and receiver to each of the radio-channel frequencies aforesaid so long as the system remains idle. When the central office operator desires to place a call, she selects an idle channel and transmits carrier frequency of that channel, modulated by dial tone, to all subscribers' stations. As the motor-driven rotary switches at the various idle subscribers' stations arrive at their respective switch contacts, which tune the radio receivers thereat to the frequency of the received carrier, the dial tone actuates the associated station selectors in such manner as to stop the motors and thus hold these stations tuned to the received carrier, so long as dialing tone is impressed thereon. The dial tone is thus transmitted for a sufficient interval before dialing is initiated, to assure that the rotary switches at all idle stations will have opportunity to contact the channel on which the dial-tone modulated carrier is received and to stop the motor rotation thereat.

The operator then proceeds to dial the station desired. The station selectors at all idle stations are actuated by these dialing pulses. At the conclusion of the dialing, the station selectors at all stations other than the particular station called, are restored to normal, thereby to energize the motor-driven rotary switches to resume testing for incoming calls. At the particular station called, however, the rotary switch is held inoperative until the call is completed under control of the subscriber's switch hook and of the incoming carrier.

To initiate an outgoing call, the subscriber removes his receiver from the hook and presses an outgoing call button. This prepares a circuit for deenergizing the motor and arresting the rotary switch as soon as it contacts a radio channel on which no carrier is incoming from the central office, this condition being indicated to the subscriber by means of a busy tone or visual signal. The motor may thereafter be held deenergized under control of the subscriber's switch hook, or, alternatively, under control of the subscriber's switch hook and a carrier current actuated relay in the radio receiver output. The subscriber thereupon depresses his handset push-button to switch on outgoing carrier of his radio transmitter, thereby to signal the central office of his desire to place a call. The operator, upon answering, switches on carrier incoming to the subscriber's station on the channel in question, thus to hold the connection in the manner above described for incoming calls, or alternatively, under exclusive control of the subscriber's switch hook.

In the drawing:

Fig. 1 is a circuit diagram of a subscriber's station in accordance with one modification of the invention as above outlined, according to which the rotary switch motor is under joint control of the subscriber's switch hook and of the carrier relay on outgoing as well as on incoming calls; while Fig. 2 is a fragmentary circuit detail illustrating a modification in which the rotary switch motor is controlled exclusively through contacts of the subscriber's switch hook on outgoing calls and also on incoming calls after the subscriber has answered.

Referring to Fig. 1, there is shown at R, in block diagram form, a superheterodyne radio receiver of conventional design and containing a master oscillator 11, working into an harmonic generator 12, for applying appropriate heterodyning frequencies to the first and second detector stages as indicated. There is also similarly shown a radio transmitter T including a master oscillator 14 feeding an harmonic generator and modulator 15, the latter feeding into a power amplifier 16. The receiver R is provided with an antenna 17 for picking up radio signals incoming from the central office to the subscriber's station. The transmitter is similarly provided with an antenna 18 for transmitting outgoing signals thereto.

For tuning the radio receiver R to the frequencies *fr*—1, *fr*—2, *fr*—3, etc. of the radio channels, there are provided a series of fixed tuning elements, such as piezoelectric crystals A, B, C, etc., individually connectible from ground at 19 through the armatures D—1, E—1, F—1, etc. and associated front contacts of the normally deenergized relays D, E, F, etc., to the control grid 21 of the master oscillator tube 22, the cathode of which is grounded at 20, through the plate current biasing resistor 24.

For similarly tuning the radio transmitter T to the frequencies *fr*—1, *fr*—2, *fr*—3, etc. of the radio channels, crystals *a*, *b*, *c*, etc., are connectible through the armatures *d*—1, *f*—1, *g*—1, etc. and associated front contacts of the normally deenergized, transmitting frequency control relays *d*, *e*, *f*, etc., between grid and cathode of the transmitter master oscillator tube 30, the oscillator circuit of which is similar to that of the receiver master oscillator R above described.

The associated pairs of receiving and transmitting frequency control relays D*d*, E*e*, F*f*, etc., are connected in parallel between negatively grounded battery 31 and over leads 32, 33, 34, etc. to successive stationary contacts, such as 35, of a rotary switch RS having a grounded rotary contact arm 36 adapted to sweep across the stationary contacts 35 successively. Switch arm 36 is keyed to a shaft 37 of a normally energized, electrical motor M, whereby the pairs of frequency control relays D*d*, E*e*, F*f*, etc. are successively, momentarily and repeatedly energized to tune the radio transmitter and receiver T, R to the carrier frequencies *fr*—1, *fr*—2, *fr*—3, etc., of the various radio channels.

A pair of group receiving and transmitting relays GR and GT have energizing windings G, H, I, etc. and *g*, *h*, *i*, etc., which are connected from negatively grounded batteries 46 and 47 to the leads 32, 33, 34, etc. respectively. Thus, as the rotary switch arm 36 passes over contacts 35, the GR and GT relays will repeatedly energize and release, along with the frequency control relays D*d*, E*e*, F*f*, etc.

When the group receiving relay GR is energized as aforesaid, it connects the audio-frequency output terminal 50 of the radio receiver, through the GR—1 armature and front contact of the GR relay and over conductors 51, 52, 53 to the acoustical receiver 54 of the subscriber's handset 55, and also over conductors 51, 52, 56, to the tuned, dial-tone, amplifier, selector and rectifier circuit 57 of the subscriber's dial pulse station selector, shown generally at 57, 58. The GR relay also functions to prepare, through its GR—2 armature and associated front contact, a holding circuit for the motor control relay MC on incoming calls, thereby to maintain the motor M deenergized for the duration of the call; and also to prepare, through its GR—3 armature and front contact, an operating and temporary holding circuit for the MC relay on outgoing calls, as explained hereinafter. In this connection, the outgoing call and MC relay control circuits are shown generally at 59.

The group transmitting relay GT functions, when energized, to connect the subscriber's handset transmitter 60 over connection 61, the front contact and GT—1 armature of the GT relay to the radio transmitter modulator input 15. In addition, the GT relay prepares a circuit traced through its GT—2 armature and associated front contact for switching on the transmitter carrier, as explained below.

The motor M which drives the rotary switch RS is normally energized from battery 62 through the MC—1 armature and back contact of the normally deenergized, motor control relay MC, which, however, when energized, short-circuits the motor armature over connection 63 extending through the MC—1 armature and associated front contact of the MC relay, whereby the motor is brought abruptly to rest by the resulting electromagnetic braking action. Again, when the MC relay is deenergized and the motor M thus energized and running, a green light 64 is lit from negatively grounded battery 65 through the back contact and grounded MC—2 armature of the MC relay. When, however, the MC relay is energized to stop motor M, the resulting switch of its grounded MC—2 armature from its back to its associated front contact, extinguishes the green lamp 64 and lights a red lamp 66 connected from battery 65 to said front contact. Now, referring to circuit 59, it will be observed that although one terminal of the MC relay winding is permanently connected to the negatively grounded battery 67, the opposite terminal extends to normally open contacts of various relays and switches, so that this relay is normally deenergized, as above stated, whereby motor M is normally running.

Bearing in mind this initial status of the system, the remaining circuits and operation can now best be explained first with reference to "incoming calls" and then with reference to "outgoing calls."

*Incoming calls*

At the central office, the operator will, on placing a call to one of the subscriber's stations, first select an idle radio channel, plug in her cord to switch on the outgoing carrier, and apply dial tone. This dial tone will be applied for a sufficient interval to permit the motors M at the various subscribers' stations to make at least one complete searching sequence before dialing is initiated.

Now reverting to the subscriber's station as shown in the drawing, the dial-tone modulated carrier will be picked up by the receiving antenna 17. Let us assume, at this point, that the operator has selected the radio channel corresponding to frequency $fr$—2, and that at the instant the carrier is first picked up by the receiving antenna, the rotary switch arm 36 is on some contact other than that connected to lead 33. Assume, for example, that at the instant in question, it is on the contact connected to lead 34.

As the switch arm 36 driven by motor M sweeps over contacts 35, it will, while on each contact, momentarily energize the transmitting and receiving frequency control relays, such as F$f$, to tune the transmitter and receiver to the corresponding frequency, and will also momentarily energize the associated GR and GT relays, the former to connect the radio receiver output to the station selector 57, 58. Since, however, under the above assumption, dial tone is being transmitted only on carrier frequency $fr$—2, nothing will occur to arrest the motor rotation until switch arm 36 sweeps onto the contact connected to lead 33.

At the instant it does this, however, the Ee relays will operate to tune the transmitter and receiver to the frequency $fr$—2 of the dial-tone modulated, incoming carrier. And concurrently therewith, the GR and GT relays will operate, so that the dial tone will be transmitted from the receiver output 50, through GR—1 and its front contact, and over connection 51, 52, 56 to the tuned station selector amplifier and rectifier circuit 57, the rectified output of which traverses the pulse relay P of the station selector. This, in turn, will energize the slow release relay SR (see circuit 58) of the station selector, over a circuit traced from negatively grounded battery 68 through the SR relay winding and thence to ground at 69 through the front contact and P—1 armature of the P relay. The SR relay, upon operating, will in turn complete a circuit to energize the motor control relay MC, this circuit being traced from negatively grounded battery 67 through the back contact and OC—2 armature of the normally deenergized outgoing call relay OC, and thence through the front contact and SR—3 armature of the now energized SR relay, to ground at 70. The resulting operation of the MC relay thus stops motor M with the rotary switch arm 36 resting on the contact connected to lead 33. Whereas the P relay is fast-operating and responds to dialing pulse interruptions of the dial tone, the SR relay, as stated, is slow-releasing and hence remains operated during dialing. Hence, the SR relay will remain operated to hold the MC relay energized and the motor M deenergized so long as dial tone is received.

As above stated, the operator applies dial tone for a sufficient period before dialing to permit the rotary switches RS at all idle subscribers' stations to come to rest on the contact which tunes the station to the frequency of the incoming carrier, whereupon the rotation of all switches is arrested for the duration of the dialing tone in the manner aforesaid. When sufficient time has elapsed as measured at the transmitter, a start signal is given the operator, whereupon she dials the number of the station desired to be called. During this period, the motors M at all stations are stopped as aforesaid and the station selectors are registering the call in the manner now to be described.

The station selector shown at 57, 58 is similar to that described in my copending application Ser. No. 729,828, filed February 20, 1947, now abandoned. Hence, its circuit and operation will be but briefly touched upon herein. In addition to the P and SR relays, the selector includes: a pulse repeat relay PR which is normally energized from battery 68 to ground at 69 through the P—1 armature and back contact of the P relay; a two-bank, minor selector switch SS including a stepping magnet SM for stepping the grounded rotary switch arms 70, 71 to successive contacts 72, 73 respectively, a release magnet RM for restoring the switch arms to zero, and a decade switch DS for transferring the code switching from the lower bank of contacts 72 to the upper bank of contacts 73. In addition, the station selector includes a release control relay RC and a calling or bell ringing relay BR.

As explained in my copending application referred to, during dialing, the stepping magnet SM will be successively actuated by the PR—1 relay in response to dialing pulse actuations of the P relay, the SR relay remaining energized. As each digit of the called number is dialed, the selector switch arms 70, 71 will thus be stepped around correspondingly. However, at all stations at which the switch arms 70, 71 come to rest at any stage of the dialing on contacts 72, 73, other than those to which the RC, DS and BR relays are wired, as shown, the release magnet RM will operate to restore the switch arms to zero. And since these contacts are wired in accordance with preselected codes which are different for each station, only at the station called will one of the switch arms 70, 71 always come to rest on a contact wired as aforesaid, in which event the RM magnet is prevented from operating except upon the contact to which the DS relay is wired, the RM magnet being otherwise held from operating by the SR and RC relays which remain energized, whereby ultimately the BR relay is energized and locked up at the called station before the selector switch thereat is restored.

The dialing codes are so arranged that the switch arm 71 ultimately comes to rest on contact 74 at the station called, but not at any other station. This completes a circuit for energizing the BR relay from battery at 68 to ground through contact 74 and grounded switch arm 71 of the selector switch. Relay BR, upon operating, locks up to ground at 75 through its BR—2 armature and associated front contact and through a back contact and TB—1 armature of a normally deenergized transmitter button relay TB, the function of which will be explained below.

Now reverting to the motor control relay MC, it will be recalled that this relay was energized at all idle stations by operation of the SR relay and through the SR—3 armature and front contact thereof. Accordingly and at all stations other than that called, the MC relays will release upon cessation of the dial tone, thereby to energize the associated motors M and RS switches, and thus resume searching for incoming calls. At the called station, however, the MC motor is held deenergized after cessation of the dial tone by the holding circuit provided by the front contact and BR—1 armature of the BR relay connected in parallel to the SR—3 armature and front contact of the SR relay.

During dialing, the DS relay at the called station is energized from battery 76 when switch arm 70 comes to rest on contact 77, thereby connecting ground to the relay winding. The DS relay, upon operating, locks up temporarily to ground at 78 through its DS—2 armature and front contact and the SR—2 armature and front contact of the SR relay, which, as stated, remains energized during reception of dialing tone. Thus, the DS relay releases as soon as the dial tone is cut off. Now, when the BR relay is actuated at the called station as aforesaid, it lights a lamp 78*a* in shunt therewith, and also completes an additional circuit for actuating a bell or buzzer 78*b*, from battery 78*c* to ground at 78 through the front contact and BR—3 armature and front contact of the BR relay and thence through the front contact and SR—2 armature of the SR relay. This bell or buzzer will accordingly remain energized either until the dial tone is cut off to release the SR relay, or alternatively until the called station answers and depresses a push-button 79 provided on the handset 55, thereby to connect ground at 80 to the TB relay winding, which receives battery at 81. The TB relay, upon operating, opens at its TB—1 armature and back contact the holding circuit for the BR relay, which thereupon releases to open, at its BR—3 armature and front contact, the aforesaid energizing circuit for the bell or buzzer 78*b*, which is thereupon deactivated, dial tone having been taken off the line by this time to open the parallel holding circuit traced through the SR—2 armature of the SR relay. Cessation of the dial tone prior to answer by the subscriber does not release the BR relay or extinguish lamp 78*a*. These remain energized until the subscriber answers and actuates the push-button 79, thereby to energize the TB relay.

Since at the called station, the MC relay was initially energized through the SR—3 contacts and then held through contacts BR—1 upon release of SR—3, a third holding circuit is required for this relay for the duration of the call upon release of the BR relay when the subscriber answers. This third holding circuit is traced from battery 67 and the MC relay winding, through the normally open, but now closed, contact 82 of the subscriber's handset switch hook SH, thence through the OC—1 armature and back contact of the normally deenergized OC relay, through the front contact and GR—2 armature of the GR relay, now energized as aforesaid, and thence through the front contact and CR—1 armature of a carrier relay CR to ground at 20. The carrier relay CR is connected, as shown, in the output stage of the radio receiver R and is energized by a rectified component of the received carrier current. This relay is accordingly energized by incoming carrier of the frequency to which the receiver is tuned and remains thus energized until it is switched off. Thus, in the present instance, the MC relay will be energized at the called station for the duration of the call. The MC relay is provided with a short-circuiting winding closed through MC—5, whereby it is fast to operate but slow to release.

As above explained, operation of the GR and GT relays at the called station connects the subscriber's handset receiver 54 to the radio receiver output, and connects the handset transmitter 60 to the radio transmitter input, and also prepares a circuit for switching on the outgoing carrier. This latter circuit is completed when the subscriber depresses the handset push-button 79 to energize the TB relay as aforesaid, being traced from battery at 83 through the TB—2 armature and front contact of the TB relay, thence through the MC—4 armature and front contact of the now energized MC relay, thence through the front contact and GT—2 armature of the now energized GT relay, and through the winding of an outgoing carrier relay CT to ground at 84. The CT relay is provided with a CT—1 armature and back contact, which normally short-circuits the grid-cathode input to the outgoing carrier master oscillator tube 30, and thus normally prevents this tube from oscillating. When, however, relay CT is energized as aforesaid, this short-circuit is removed and tube 30 then oscillates at the frequency determined by the crystals *a*, *b*, *c*, etc. connected between its grid and cathode, in the present instance, crystal *b* corresponding to outgoing carrier frequency *fr*—2.

At the conclusion of the call, the MC relay will be deenergized either by the subscriber replacing his handset on the switch hook SH to open at contact 82 the holding circuit for the MC relay, or by the central office operator switching off the incoming carrier to release the CR relay and thus open at its CR—1 contacts, the MC relay holding circuit. In this way, searching of the rotary switch RS is resumed at the called station, whereupon the GR and GT relays release along with the previously energized frequency control relays, in this case Ee. The system is thus restored to its normal or idle condition, since all other relays were previously restored as explained.

*Outgoing calls*

On an outgoing call, the subscriber will remove the handset 55 from the switch hook SH and depress the outgoing call button PB in the outgoing call circuit 59. This will energize the outgoing call relay OC, provided no incoming call has been registered, so that the BR relay is deenergized, and provided further that no dial tone is being received, so that the SR relay is deenergized, this circuit being traced from battery 84 through the winding of the outgoing call relay, thence through the contacts of the outgoing call button PB, thence through the back contact and SR—2 armature of the SR relay, and thence through the back contact and BR—4 armature of the BR relay to ground at 85. If the BR and SR relays are deenergized, the same holds true for the MC relay since, as was explained in connection with incoming calls, the operating and holding circuits for the M relay are traced through the back contacts and SR—3 and BR—1 armatures of the SR and BR relays. Accordingly, when the OC relay is energized as aforesaid, it will close a locking circuit for itself traced from the OC relay winding, through its front contact and OC—3 armature, and thence through the MC—3 armature and back contact of the MC relay to ground at 85. During this operation, no outgoing carrier is being transmitted from the subscriber's station, inasmuch as the control circuit for the outgoing carrier, as above traced in connection with incoming calls, includes the MC—4 armature and associated front contact of the MC relay. In this connection, the circuits which initially energize and hold the MC relay on incoming calls are broken at the OC—2 armature contacts of the now energized OC relay. However, when the OC relay operates and locks up as aforesaid on outgoing calls, a new circuit is prepared for operating the MC relay, this circuit being traced from battery 67 through the MC relay winding, thence through the now closed contact 82 on the switch hook SH, thence through the OC—1 armature and front contact of the now energized OC relay, to the front contact of armature GR—3 of the GR relay, and thence through the back contact and grounded armature CR—1 of the CR relay to ground at 20. This circuit will energize the MC relay as soon as the rotary switch RS tunes the radio receiver to a radio channel on which no carrier is incoming from the central office. When such a channel is located, the GR relay will be operated as aforesaid, but the CR relay will be released, the latter due to the absence of incoming carrier, thereby to complete the operating circuit for the MC relay above traced. When the MC relay is thus operated, it switches the aforesaid holding circuit for the OC relay from ground provided at 85 through the MC—3 armature and back contact of the MC relay, to the ground provided at 20 through the MC—3 armature and front contact of the MC relay, over connection 86, and through the GR—3 contacts of the GR relay when energized and the CR—1 contacts of the CR relay when deenergized. In this position, the MC relay will hold, so long as no carrier is incoming from the central office on the radio channel in question, thereby to hold the CR relay inoperated. So long as the motor is running and the rotary switch thereby searching for a radio channel on which no carrier is incoming, the green light 64 will remain lit to so advise the calling subscriber. When, however, the motor is deenergized, as above explained, to bring the rotary switch to rest on an idle channel, the green light will be extinguished and the red light 66 energized by operation of the MC relay, thus advising the calling subscriber that he may now actuate the handset button 79 to switch on the outgoing carrier from transmitter T. In addition, the subscriber will receive a busy tone from source 79a through the MC—5 armature and back contact of the MC relay until the relay operates. At this point, it is to be noted that upon actuation of the MC relay, the transmitter power control circuit is closed except at the TB—2 contacts of the TB relay, inasmuch as the MC—4 contacts are closed by operation of the MC relay, and the GT—2 contacts are closed by operation of the GT relay. Accordingly, when the handset push-button 79 is depressed by the subscriber, the TB relay will operate the TB—2 contacts of the power circuit, thereby to switch on the outgoing carrier. The carrier thus outgoing from the transmitter T will be picked up by the central office receiver on the idle channel, and thus signal the operator, who in turn will switch on the carrier outgoing from the central office and incoming to radio receiver R at the subscriber's station. This, in turn, will operate the CR relay to transfer its CR—1 armature from its back to its front contact. This releases the OC relay, thereby reestablishing the same holding circuit for the MC relay as is used on incoming calls, namely, the holding circuit traced from ground at 20 through the CR—1 armature and front contact, the GR—2 armature and front contact, the back contact and OC—1 armature, inasmuch as the above traced holding circuit for the OC relay has now been broken at the back contact of the CR—1 armature, and has accordingly released, the circuit being completed thence from the OC—1 armature through the switch hook SH and its contact 82 to the winding of the MC relay. It is to be noted in connection with the above that the OC—1 and MC—3 armature contacts are of the make-before-break type, so that the old circuit is not broken until the new circuit is established.

The clearing of circuits upon termination of an outgoing call is essentially the same as for incoming calls, inasmuch as the MC relay holding circuit is broken, either by the subscriber replacing his handset on the hook, thereby to open the switch hook contact 82, or by the central office operator disconnecting her outgoing carrier, thereby to release the CR relay at the subscriber's station, thus breaking the holding circuit at the front contact of the CR—1 armature of the carrier relay. This starts the motor and rotary switches searching again to release the group transmitting and receiving relays GR and GT, and also the operated frequency control transmitting and receiving relays D*d*, E*e*, F*f*, etc., whichever pair had been operated.

Group relays and frequency control relays, similar to GR, GT and D*d*, E*e*, F*f*, etc., may be provided for other radio channels and connected to contacts 35 of the rotary switch RS over conductors, such as 90. Also, the inputs to and outputs from additional transmitters and receivers may be multiplied to conductors 91, in the same manner as the subscriber's station shown in the drawing. In this way, a sequential search can be performed throughout a multitude of carrier frequencies, which can be located in wholly different frequency bands, and can be received and transmitted over different receivers and transmitters, and can also serve different subscribers' stations.

For a given radio channel, the carrier frequency incoming to the subscriber's radio receiver R may of course be the same or different from that outgoing on his radio transmitter T.

It will be observed that the system above described provides a holding circuit for the MC relay at the CR—1 contacts of the CR relay after a connection has been established. In the case of a mobile subscriber's station, this might result in a disconnect during a call due to release of the CR relay, should the mobile unit pass through an underpass or other "dead spot."

In such case, the Fig. 2 modification may be employed wherein once a connection is established and the subscriber's handset removed from the switch hook, the MC relay is held deenergized exclusively through the switch hook contacts. In the circuit of Fig. 2, the push-button switch PB and the OC relay are omitted. To place an outgoing call, the subscriber removes his handset from the switch hook. This completes a circuit to operate the MC relay as soon as the rotary switch RS connects the subscriber's station to a radio channel on which no carrier is incoming. This circuit is traced from negatively grounded battery 67 through the winding of relay MC, the switch hook and associated contact 82, the MC—3 armature and back contact of the MC relay, the front contact and GR—3 armature of the GR relay and the back contact and grounded CR—1 armature of the CR relay. As soon as the rotary switch RS passes onto contacts of an idle channel, this circuit will be closed to actuate the MC relay, which thereupon locks up under control of the switch hook through its MC—1 armature and grounded front contact. The MC relay will accordingly remain energized to hold the rotary switch RS in the channel in question until the subscriber replaces his handset on the hook, thereby to break this holding circuit at SH—83. As above stated, the MC—3 contacts of the MC relay are of the make-before-break type. The subscriber will be advised as to when an idle channel has been seized by cessation of the busy tone 79*a*.

On incoming calls, the circuit of Fig. 1, as modified according to Fig. 2, remains unchanged in its operation as above described, inasmuch as the subscriber's handset is on the switch hook until the called station answers.

I claim:

1. In a radio receiving system selectively responsive to modulating signals received thereby on any of a plurality of carrier current frequencies: a radio receiver, a plurality of tuning elements for tuning said receiver to said carrier frequencies respectively, a motor and switching means driven thereby to connect said tuning elements to said receiver successively, a normally closed circuit for continuously operating said motor, a tuned circuit and relay means connected thereto, responsive to a modulating signal received on any of said carrier frequencies for deenergizing said motor with said receiver tuned to said carrier, and means responsive to energization of said relay means for connecting a station selector mechanism to said tuned circuit, said selector mechanism responding to coded modulating signals received on said carrier for signaling at said station and for completing a circuit for holding said motor inoperative upon cessation of said modulating signal.

2. In a multi-channel radio communication system: a central office equipped with a plurality of radio transmitter and radio receiver channels operating on different carrier frequencies, a plurality of remote stations each equipped with a radio transmitter and radio receiver, a plurality of tuning elements at each station, a motor and switching means driven thereby for connecting said tuning elements in pairs to the transmitter and receiver thereat for concurrently tuning the same to said carrier frequencies successively, a normally closed circuit for continuously operating said motor, a selective circuit and relay means connected thereto, at each station and responsive to a modulating frequency impressed on any said carrier at said central station for stopping the motors at all said stations with the transmitters and receivers thereat tuned to said carrier, a station selector circuit at each station thereafter responding to coded interruptions of said modulating frequency for selecting and signaling any said remote station, and means including a manually actuated switch at each station for causing said motor to connect said station to an idle radio channel on outgoing calls.

3. In a radio-telephone system: a subscriber's station, including a radio-telephone transmitter and receiver; a plurality of tuning elements for tuning said transmitter and receiver to any of a preselected number of carrier frequencies; a motor and switching means driven thereby for connecting said tuning elements to said transmitter and receiver successively; a normally closed operating circuit for said motor; means including a selective circuit and switching means responsive to a modulating signal impressed on any said carrier frequency incoming to said receiver, for deenergizing said motor when said receiver is tuned to said carrier; alternative means including a switch and additional relay means for deenergizing said motor when said receiver is tuned to any said carrier frequency on which no carrier is incoming to said receiver; and means including an additional switch for thereafter energizing said transmitter to transmit outgoing carrier on said frequency.

4. In a radio-telephone system: a subscriber's station including a radio transmitter and receiver and a subscriber's telephone set normally resting on a switch hook; a plurality of tuning elements for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; means including said switch hook and a carrier current actuated relay in said receiver, for thereafter holding said motor inoperative, upon removal of said telephone set from said switch hook; means for initiating an outgoing call from said station, including a manually actuated switch and a carrier current actuated relay for stopping said motor when said station is tuned to any said carrier frequency on which no carrier is incoming to said receiver; means including said carrier relay for thereafter holding said motor inoperative on receipt of incoming carrier on said frequency; and means including an additional switch for thereafter energizing said transmitter to transmit outgoing carrier on said frequency.

5. In a radio-telephone system: a subscriber's station including a radio transmitter and receiver and a subscriber's telephone set normally resting on a switch hook; a plurality of tuning elements for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; a station selector thereafter responding to coded interruptions of said modulating signal for selecting and signaling said station; means including said switch hook and a carrier current actuated relay in said receiver, for thereafter holding said motor inoperative, upon removal of said telephone set from said switch hook; means for initiating an outgoing call from said station, including a manually actuated switch and a carrier current actuated relay for stopping said motor when said station is tuned to any said carrier frequency on which no carrier is incoming to said receiver; means including said carrier relay for thereafter holding said motor inoperative on receipt of incoming carrier on said frequency; and means including an additional switch for thereafter energizing said transmitter to transmit outgoing carrier on said frequency.

6. In a radio-telephone system: a subscriber's station including a radio transmitter and receiver and a subscriber's telephone set normally resting on a switch hook; a plurality of tuning elements adapted for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; a station selector thereafter responding to coded interruptions of said modulating signal for selecting and signaling said station; a circuit responsive to said station selection for thereafter holding said motor inoperative upon cessation of said modulating frequency; means including said switch hook and a carrier current actuated relay in said receiver, for thereafter holding said motor inoperative, upon removal of said telephone set from said switch hook; means for initiating an outgoing call from said station, including a manually actuated switch and a carrier current actuated relay for stopping said motor when said station is tuned to any said carrier frequency on which no carrier is incoming to said receiver; means including said carrier relay for thereafter holding said motor inoperative on receipt of incoming carrier on said frequency; and means including an additional switch for thereafter energizing said transmitter to transmit outgoing carrier on said frequency.

7. In a radio-telephone system: a subscriber's station including a radio transmitter and receiver and a subscriber's telephone set normally resting on a switch hook; a plurality of tuning elements for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; a station selector thereafter responding to coded interruptions of said modulating signal for selecting said station; means including a calling relay responsive to said station selection for signaling said station and for thereafter holding said motor inoperative upon cessation of said modulating frequency; a locking circuit for said calling relay; means including said switch hook and a carrier current actuated relay in said receiver, for thereafter holding said motor inoperative upon removal of said telephone set from said switch hook; means for initiating an outgoing call from said station, including a manually actuated switch and a carrier current actuated relay for stopping said motor when said station is tuned to any said carrier frequency on which no carrier is incoming to said receiver; means including said carrier relay for thereafter holding said motor inoperative on receipt of incoming carrier on said frequency; and means including an additional switch and relay means for thereafter opening said calling relay locking circuit and for energizing said transmitter to transmit outgoing carrier on said frequency.

8. In a radio-telephone system: a subscriber's station including a radio transmitter and receiver and a subscriber's telephone set normally resting on a switch hook; a plurality of tuning elements for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; means including said switch hook for thereafter holding said motor inoperative, upon removal of said telephone set from said switch hook; means for initiating an outgoing call from said station, including said switch hook and a carrier current actuated relay in said receiver for stopping said motor when said station is tuned to any said carrier frequency on which no carrier is incoming to said receiver; additional means including said switch hook, but excluding said carrier relay, for thereafter holding said motor inoperative so long as said telephone set is off said switch hook; and means including a manually actuated switch for thereafter energizing said transmitter to transmit outgoing carrier.

9. In a radio-telephone system: a subscriber's station including a radio transmitter and receiver and a subscriber's telephone set normally resting on a switch hook; a plurality of tuning elements for tuning said station to any of a preselected number of carrier frequencies; means including said tuning elements, together with a motor and switching means driven thereby for tuning said station to said carrier frequencies successively; a normally closed operating circuit for said motor; means including a selective circuit and relay means connected thereto, responsive to a modulating signal impressed on any said carrier frequency incoming to said receiver for deenergizing said motor when said receiver is tuned to said carrier; a station selector thereafter responding to coded interruptions of said modulating signal for selecting and signaling said station; means including a relay responsive to said station selection for thereafter holding said motor inoperative until said subscriber's telephone set is removed from said switch hook; additional means including said switch hook for holding said motor inoperative upon removal of said telephone set from said switch hook; means for initiating an outgoing call from said station, including said switch hook and a carrier current actuated relay in said receiver for stopping said motor when said station is tuned to any said carrier frequency on which no carrier is incoming to said receiver; means including said switch hook, but excluding said carrier relay, for thereafter holding said motor inoperative so long as said telephone set is off said switch hook; and means including a manually actuated switch for thereafter energizing said transmitter to transmit outgoing carrier.

EVERHARD H. B. BARTELINK.

REFERENCES CITED

The following references are of record in the file of this patent:

UNITED STATES PATENTS

| Number | Name | Date |
|---|---|---|
| 1,596,251 | Hammond | Aug. 17, 1926 |
| 1,979,588 | Vreeland | Nov. 6, 1934 |
| 2,056,200 | Lowell | Oct. 6, 1936 |
| 2,176,868 | Boswau | Oct. 24, 1939 |
| 2,193,843 | Robinson | Mar. 19, 1940 |
| 2,218,905 | Cooper | Oct. 22, 1940 |
| 2,262,766 | Jansson | Nov. 18, 1941 |
| 2,300,081 | White | Oct. 27, 1942 |
| 2,368,778 | Purington | Feb. 6, 1945 |
| 2,394,869 | Nicholson | Feb. 12, 1946 |
| 2,412,991 | Labin | Dec. 24, 1946 |
| 2,418,139 | Preisman | Apr. 1, 1946 |
| 2,419,593 | Robinson | Apr. 29, 1947 |
| 2,433,290 | Mitchell et al. | Dec. 23, 1947 |
| 2,452,878 | Little | Nov. 2, 1948 |
| 2,458,558 | Bradley | Jan. 11, 1949 |
| 2,479,701 | Ress | Aug. 23, 1949 |
| 2,487,772 | Nicholson | Nov. 8, 1949 |